(12) United States Patent
Phillips

(10) Patent No.: US 6,200,367 B1
(45) Date of Patent: Mar. 13, 2001

(54) WATER WASHABLE STAINLESS STEEL HEPA FILTER

(76) Inventor: Terrance D. Phillips, 617 Chestnut Ct., Aiken, SC (US) 29803

(*) Notice: Subject to any disclaimer, the term of this patent is extended or adjusted under 35 U.S.C. 154(b) by 0 days.

(21) Appl. No.: 09/358,782

(22) Filed: Jul. 22, 1999

Related U.S. Application Data

(63) Continuation-in-part of application No. 08/966,276, filed on Nov. 7, 1997, now abandoned.

(51) Int. Cl.[7] .......................... B01D 29/33; B01D 39/20; B01D 46/24
(52) U.S. Cl. ................... 95/278; 95/281; 96/233; 96/417; 55/301; 55/523
(58) Field of Search ................... 95/273, 281, 1, 95/8, 278; 96/233, 417; 55/502, 523, 301

(56) References Cited

U.S. PATENT DOCUMENTS

| | | | | |
|---|---|---|---|---|
| 2,513,174 | * | 6/1950 | Hess | 95/281 X |
| 2,889,048 | * | 6/1959 | Nordin | 55/301 X |
| 3,397,871 | * | 8/1968 | Hasselberg | 55/523 X |
| 3,557,536 | * | 1/1971 | Ririe | 55/523 X |
| 3,881,899 | | 5/1975 | Spulgis | 55/387 |
| 3,933,652 | | 1/1976 | Weichselbaum et al. | 210/446 |
| 4,391,615 | * | 7/1983 | Iniotakis | 95/273 X |
| 4,500,328 | * | 2/1985 | Brassell et al. | 95/273 |
| 4,584,004 | | 4/1986 | Komatsu et al. | 55/422 |
| 4,655,797 | | 4/1987 | Iniotakis et al. | 55/16 |
| 4,687,579 | * | 8/1987 | Bergman | 55/523 X |
| 4,731,100 | * | 3/1988 | Loeffelmann et al. | 96/233 X |
| 4,865,803 | | 9/1989 | Dillmann et al. | 376/314 |
| 4,888,114 | * | 12/1989 | Gaddis et al. | 55/523 X |
| 4,894,158 | * | 1/1990 | Morita et al. | 55/523 X |
| 4,902,420 | * | 2/1990 | Pall et al. | 55/523 X |
| 4,979,969 | * | 12/1990 | Herding | 55/523 |
| 5,114,447 | | 5/1992 | Davis | 55/485 |
| 5,158,586 | * | 10/1992 | Layton | 55/523 X |
| 5,198,006 | * | 3/1993 | Mimori et al. | 55/523 |
| 5,358,552 | | 10/1994 | Seibert et al. | 95/281 |
| 5,456,740 | * | 10/1995 | Snow et al. | 55/523 X |
| 5,487,771 | | 1/1996 | Zeller | 55/523 |
| 5,564,755 | * | 10/1996 | Ackermann et al. | 55/523 X |
| 5,716,429 | * | 2/1998 | Van Wijck et al. | 95/273 |
| 5,795,359 | * | 8/1998 | McLeish et al. | 55/523 X |

* cited by examiner

Primary Examiner—Robert H. Spitzer
(74) Attorney, Agent, or Firm—Hardaway/Mann IP Group

(57) ABSTRACT

The invention is a high efficiency particulate (HEPA) filter apparatus and system, and method for assaying particulates. The HEPA filter provides for capture of 99.99% or greater of particulates from a gas stream, with collection of particulates on the surface of the filter media. The invention provides a filter system that can be cleaned and regenerated in situ.

14 Claims, 2 Drawing Sheets ed state, with a minimum of parts, expense, and time.

WATER WASHABLE STAINLESS STEEL HEPA FILTER

This application is a continuation-in-part of U.S. patent application Ser. No. 08/966,276, now abandoned, filed Nov. 7, 1997 and assigned to Westinghouse Savannah River Company.

STATEMENT OF GOVERNMENT RIGHTS

The United States Government has rights in this invention pursuant to Contract No. DE-AC09-89-SR18035 between the U.S. Department of Energy and Westinghouse Savannah River Company.

BACKGROUND OF THE INVENTION

The invention relates generally to filter units of the high efficiency particulate (HEPA) type capable of filtering submicron particulates, and more particularly to a thin HEPA filter unit made of sintered stainless steel metal that is washable in situ. The invention relates most preferredly to high pressure drop HEPA filters capable of being cleaned of particulates and restored to full flow operation in a short time, with a minimum of generated waste, and with a minimal number of parts and cleaning steps.

For clarity, references to HEPA filters herein are references to filters and/or filter systems capable of and routinely required to pass smoke testing demonstrating the removal from a fluid stream of about 99.97% of 0.3 micrometer (0.3 $\mu$) dioctylphthalate (DOP) monodispersed particles. This is a standard definition familiar to those of skill in the art.

High Efficiency Particulate (HEPA) filters have been utilized for filtration of submicron particles from exhaust gas streams, and especially for the filtration of radiative particles from exhaust gases.

To date, makers and users of HEPA filters have focused on the development of filters that generate very low pressure drops in the course of removing particulate matter from the fluid stream. Low pressure drop has been thought to be necessary and advantageous because it requires only a relatively low power blower (or evacuator) system, and places little mechanical stress on the filter and on the filter support or framing structure. A consequence of requiring a low pressure drop, however, is a relatively low filtration rate measured, e.g., in cubic feet per minute. To compensate for these low flow-through rates, various configurations of filters and systems have been advanced to increase the overall flow rate by increasing the effective surface area of the filter. Thus, configurations such as accordion-folded, pleated, or other techniques have been suggested, each designed to enlarge the usable filter surface area while complying with space and other constraints imposed by the overall system.

Another problem faced by users of HEPA filters, and particularly users filtering exhaust gas streams from nuclear facilities, is filter life. Filter life is defined and determined with reference to a given filter's continued ability to provide sufficient fluid flow rates while continuing to prevent passage of the particulates to be filtered. For many industries and uses, the end of life for a HEPA filter constitutes a major expense and disposal problem. A filter in a nuclear facility, for example, is costly to replace in terms of time, manpower, and materials, including the temporary loss of use of the exhaust stream path. It also may pose a hazard due to the particulates entrapped or adhered to the filter, creating risks to personnel and a need for long term storage and disposal. Thus, extending the useful life of a HEPA filter presents a major saving in resources and safety to such facilities.

One approach to extending the life of a filter has been to provide means of cleaning or washing the filter, either in situ or upon removing the filter from its frame or mounting. The systems, methods, and apparatus known to date, however, each involve relatively complicated procedures or mechanisms, which are expensive and themselves liable to failures and breakdowns. The systems are subject to the parameters of the overall system, meaning that they must each work in a low pressure drop system. Other solutions include using modular components, allowing the filter to be taken off-line and cleaned. This too is highly expensive, and does not increase the expected life of each given filter, meaning that no real savings are achieved.

In Zeller, U.S. Pat. No. 5,487,771, a high efficiency metallic membrane of sintered nickel powder is disclosed. The membrane is sandwiched inside a frame, with improved porosity and gas throughput offered by the filter. In Layton, U.S. Pat. Nos. 5,238,477 and 5,158,586, HEPA filter units are disclosed having metallic membranes of continuous metal sheet accordion-folded to filter out submicron particles. The filters are resistant to elevated temperatures and are composed of stainless steel and other metals. In Davis, U.S. Pat. No. 5,114,447, an ultra-high efficiency particulate air filter is disclosed which is composed of multiple, porous, sintered metal filter discs manufactured from stainless steel, nickel and nickel alloys. The filter discs are enclosed permanently within a cylindrical casing, and the filter discs are resistant to high temperatures and pressures.

In Dillmann, et al., U.S. Pat. No. 4,865,803, a pressurized gas discharge filtration system is disclosed which includes stainless steel fiber filter packs aligned in multiple stages. The fiber filter packs are resistant to high temperatures. In Iniotakis, et al., U.S. Pat. No. 4,655,797, a microporous metallic membrane screen is disclosed for filtration of corrosive gas streams. The metallic membrane screens have metals such as gold or platinum catalytically deposited on the metal screens to provide corrosion resistance. In Komatsu, et al., U.S. Pat. No. 4,584,004, a chamber of particulate filters is disclosed, with the filters made of organic fiber material. A chamber is provided containing back-flushing nozzles for pulsed air cleaning of particulates entrapped inside the fiber filters.

In Weichselbaum, et al., U.S. Pat. No. 3,933,652, a process is disclosed for manufacturing a stainless steel filter for use in medical infusion equipment. The filter is made of sintered stainless steel particles, and is sealed inside a tubular fitting. In Spulgis, U.S. Pat. No. 3,881,899, an apparatus for dislodging particulates from a rechargeable filter is disclosed, where the filter is placed inside the apparatus, and the particles are removed from the filter using a pneumatic air delivery apparatus. The filter material in the particulate filter is finely divided activated charcoal.

In Seibert et al., U.S. Pat. No. 5,358,552, a process is disclosed for introducing a backwash liquid. The backwash liquid is forced through the filter in the direction opposite the normal flow of the stream to be filtered (in an upstream direction). The purpose is to flush the filter by forcing trapped particulates out of the filter in the direction from which the particulates became entrained in the filter media, thus cleaning the filter.

These and other prior filters have a variety of shortcomings. Some of them, while capable of relatively full cleaning, are incapable of achieving HEPA standards and/or of withstanding the required operating environment. Others are incapable of being cleaned, or at least cannot be cleaned to even a relatively high percentage of full flow and filtering ability. Others must simply be replaced, while many cannot be cleaned in situ. Of those that can be cleaned in situ, they require very complicated backflushing mechanism, requiring not only the installation of additional components, but requiring the installation of complicated recovery systems.

There is thus a need in the art for a HEPA filter that is capable of providing the required filtration and is resistant to damage, that can be cleaned repeatedly in situ at low cost and low complexity, that can be cleaned and restored to full filtering capability at the pressure drop required, and that will allow recovery of the removed particulates for reclamation and/or analysis.

SUMMARY OF THE INVENTION

It is an object of this invention to provide a HEPA filter that filters submicron airborne particles from exhaust gas streams.

It is a further object of this invention to provide a HEPA filter that filters radioactive particles at a high efficiency from exhaust gas streams.

It is moreover an object of this invention to provide a HEPA filter and system by which the filter can be restored to full flow and filtration capability by in situ cleaning.

It is a more particular object of this invention to provide a HEPA filter that is washable in situ by cleaning with a liquid such as water or such as acids particularly suited to removal of particulates, the liquid being used on the influent side of the filter.

It is likewise an object of this invention to provide a HEPA filter that can be spray washed, after which it can be restored to full flow and filtration capability by application of a hard vacuum providing a high pressure drop.

It is another object of this invention to provide a HEPA filter capable of the cleaning and restoration referred to above while also being resistant to high temperature environments as in melters and incinerators.

These and other objects of the invention are accomplished by providing a filter system for removing particulates from an air stream, the system having a HEPA filter comprising a thin sheet formed of sintered particles, the particles having a size of approximately 1.0 $\mu$, the filter having an influent side and an effluent side; a cleaning system for the filter, the cleaning system comprising means for spraying said influent side of said filter with a fluid; and means for creating a high pressure drop across said filter. The HEPA filter is resistant to high pressure drops across the filter plate, and does not degrade in high temperature conditions. The apparatus described provides for an improved method to collect radioactive particles on the influent surface of the filter by the use of very small pore diameters through the HEPA filter, while providing a noncorrosive filter media that is washable in situ.

Thus, the objects of the invention are also accomplished by providing a method for periodic monitoring of a gas stream using an in situ filter system, said method comprising providing an in situ filter system for said stream, said system comprising: a HEPA filter, said filter having an influent side and an effluent side, said influent side having an effective pore size of about 0.2 $\mu$; means for cleaning said filter by directing a fluid against said influent side of said filter to remove particulates therefrom; and means for collecting said fluid and said particulates; periodically activating said means for cleaning; collecting said fluid and said particulates from said means for collecting; and analyzing said particulates to monitor said gas stream.

BRIEF DESCRIPTION OF THE DRAWINGS

Various other features and advantages will become apparent from a reading of the following detailed description, given with reference to the various figures of drawing, in which.

DETAILED DESCRIPTION

Figure 1:
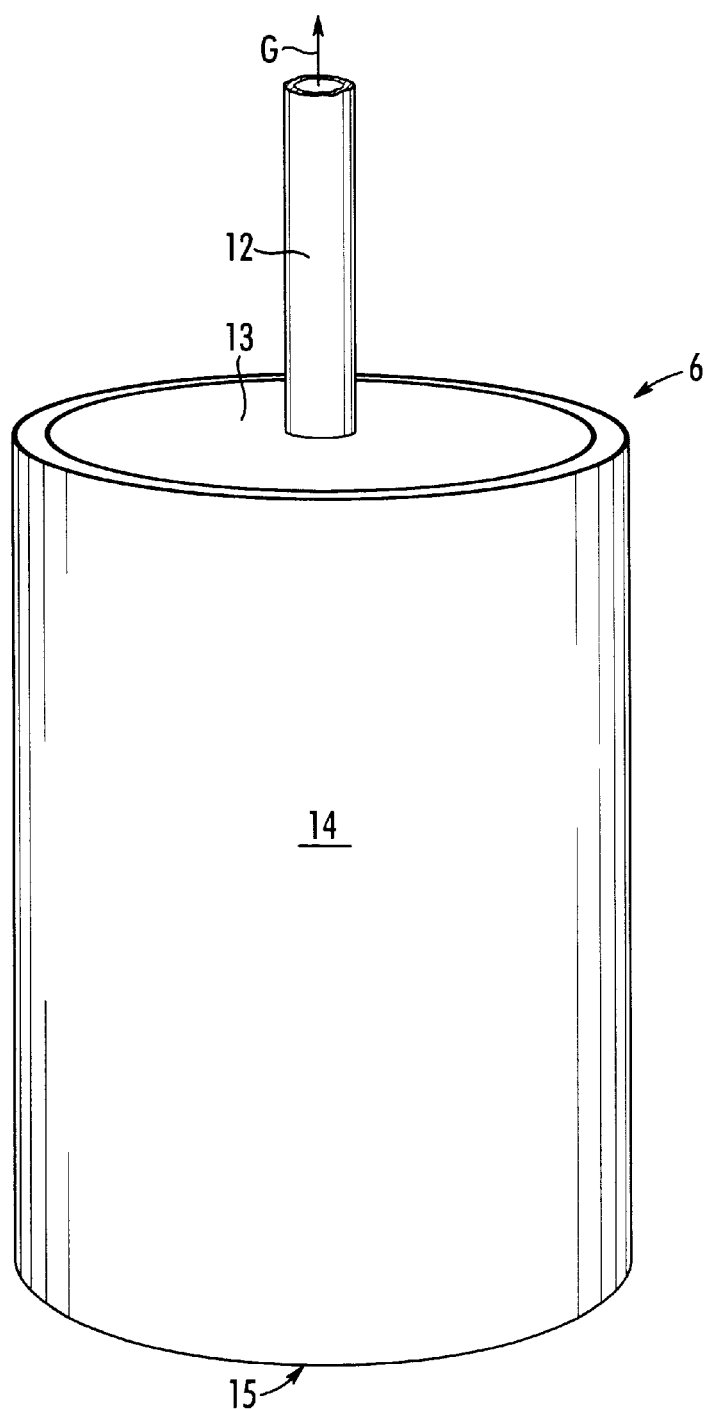
FIG. 1 is a depiction of a preferred embodiment of a HEPA filter according to the invention.

In accordance with this invention, it has been found that high efficiency filters are required to remove radioactive particulates from exhaust gas streams from areas contaminated with radiation. It is desirable to capture 99.97% or greater of particulates or aerosol particles of the size of 0.3 micrometer aerodynamic diameter (AED) or larger, by the use of high efficiency particulate (HEPA) filters. The filters must be capable of withstanding high temperatures from heated exhaust gas flow, and high air flow pressures through the filter over extended periods of time.

As explained above, it is the current state of the art to use fibers to form HEPA filters. The fibers may be of organic or inorganic material, and may be sintered metal fibers. Such construction leads to the use of low pressure (vacuum) systems. These systems have the advantage of requiring little power for the evacuation process, and the presence of low mechanical stress on the filters. As a consequence, however, the amount of fluid, per unit area, that can be filtered is relatively small. Efforts to improve this factor have led to pleated and folded filter media.

Another problem with the use of fibers is that when even metal or glass fiber filters are wetted, they become effectively plugged. It is speculated that, given the small pore sizes of HEPA filters, simple surface tension prevents the liquid from being pulled through the fibers. This problem is particularly compounded where the filters have already collected particulates.

Tests at the Westinghouse Savannah River Company have shown that, once wetted, state of the art HEPA filters cannot be unplugged even by the application of a vacuum as high as 105 kPa (421 inches water column). Instead, the filters must simply be allowed to passively dry completely before being used again.

Cleaning HEPA filters known to the art has so far been accomplishing only by backwashing with a fluid. Backwashing removes particulates that have been entrained into the mesh of the fibers of the filter. Backwashing requires either removing the filter from the system, or installing in the system a complicated series of valves, piping, and other apparatus necessary to accomplish the backwashing.

These problems are completely avoided through use of the filter media of the current invention. A sintered material having a thickness in the range of from about 0.033 cm to about 0.12 cm (0.013 to 0.047 inches) is formed by sintering particles or pellets having a diameter of about one micron (1.0 $\mu$). It is preferred that the particles be of stainless steel, thus providing a media having good mechanical strength, resistance to high temperatures, and good chemical resistance.

Such a media for HEPA filters is a radical departure from the current state of the art, not only in using pellets instead of fibers, but also because this media requires the use of a very high vacuum during normal operation. A HEPA filter constructed according to the invention requires a standard operating vacuum of about 40 kPa (160 inches water column) to achieve a gas flowthrough rate of about 0.00017 cubic meters per 0.006 square meters of media area (0.35 cfm per square inch). An operating vacuum of this magnitude would destroy standard HEPA filter media.

Also, the media according to this invention permits cleaning by application of fluid to only the influent side of the filter, effectively washing off the particulates. It is speculated that such washing of the influent side, as opposed to backwashing or other methods, is made possible because particulates do not become entrained in the mesh of the media, but are trapped on the surface of the media. Because the particulates are not entrained, a fluid stream easily washes the particulates off.

A surprising aspect of the invention is then the restoration of the filter, or regeneration, following the washing. Although wetted, the media of the current invention can be restored to full flowthrough by the application of a vacuum on the order of 105 kPa (421 inches water column). This exceedingly high pressure drop removes the fluid from the media, after which the pressure may be reduced to the vacuum normal for this type of filter. In tests conducted on the material, repeated washings and regenerations have led to no detectable decrease in the operating characteristics of the filters.

A preferred embodiment of the apparatus shown in FIG. 1 is a metal HEPA filter assembly 6, composed of stainless steel particles or pellets (not shown) of a one micron (1.0 $\mu$) size, that are sintered together to form a stainless steel filter media 14. With this construction, the media has micro-pores of an approximate diameter of 0.2 micron (0.2 $\mu$). The stainless steel sintered material with 0.2 $\mu$ porosity is available from commercial vendors such as Mott Metallurgical Corporation, Farmington, Conn.

The stainless steel filter media 14 having an effective porosity of 0.2 micron, was manufactured specifically for the embodiment described herein. The stainless steel filter media 14 is formed into a very thin sheet having uniform porosity across the surface thereof. The sheet can have a thickness in the range of from about 0.033 cm to about 0.12 cm (0.013 to 0.047 inches). Experiments conducted by the inventor hereof, for example, were completed using a filter having a thickness of approximately 0.12 cm (0.047 inches).

Although the filter media may be made and used as a sheet, it is preferred that the filter be formed into a cylinder as shown in FIG. 1 to take advantage of the mechanical strength afforded by such a shape. The cylinder is hollow, thus having an interior and an exterior, and ends. In the preferred embodiment according to this invention, as will be shown, the exterior of the cylinder forms the influent side of the filter, that is, the "upstream" side of the filter. The interior of the cylinder is thus the effluent, or "downstream," side of the filter media.

In the preferred embodiment illustrated in FIG. 1, the cylinder is provided with an impermeable end cap 15 (occluded). End cap 15 is preferably stainless steel and is affixed to the cylinder, preferably by a means such as welding. Welding increases the mechanical strength of the filter.

A similar end cap 13 is affixed, again preferably by welding, to the other end of cylinder 14. This end cap 13 is provided with a hole that may have, e.g., a connection 12 attached thereto. As will be explained below, connection 12 connects the interior of the cylinder to an evacuation means such as a vacuum pump. When the pump is activated, the gas stream to be filtered will be drawn from the exterior of the cylinder to the interior and out toward the pump as shown by the arrow G.

Figure 2:
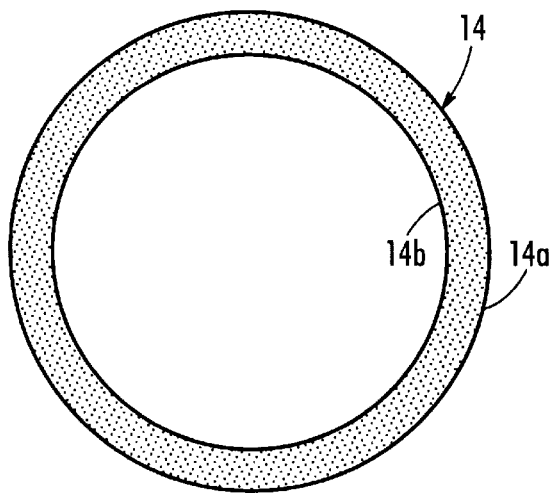
FIG. 2 is a longitudinal cross-section of the filter shown in FIG. 1.

FIG. 2 shows a diagrammatic cross-section of the cylindrical filter media 14 shown in FIG. 1. As described, the media 14 is created by sintering small particles or pellets having a size of about 1.0 $\mu$. This provides the desired porosity of about 0.2 $\mu$. FIG. 2 shows the influent exterior side 14a of the cylinder and the effluent interior side 14b thereof.

Figure 3:
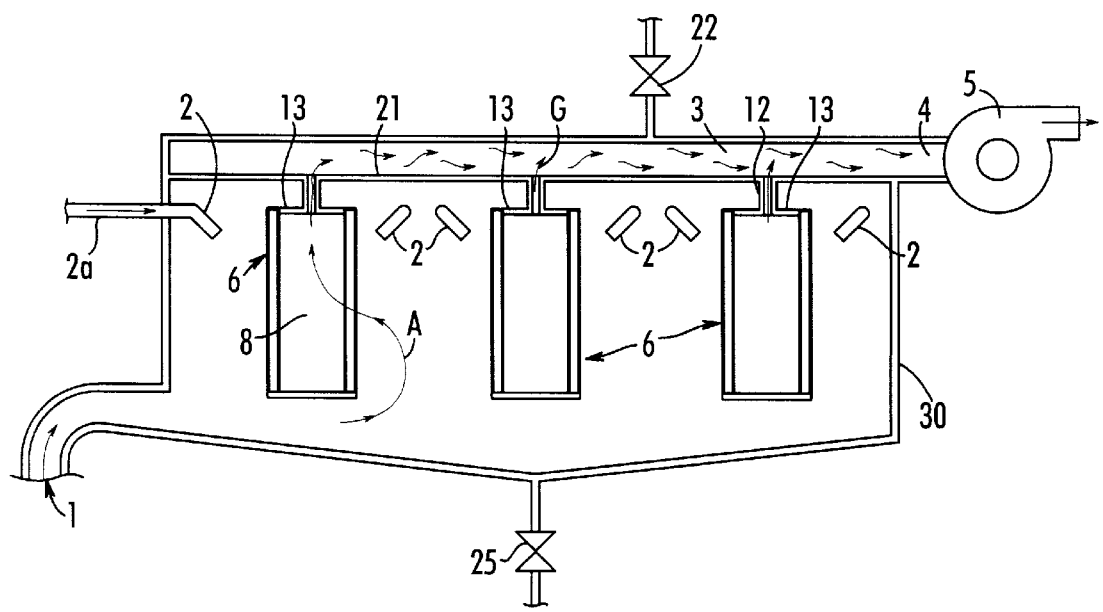
FIG. 3 is a depiction of another preferred embodiment of a HEPA filter system according to the invention.

FIG. 3 is a depiction of a system in accordance with the invention, by which the in situ cleaning and regeneration of HEPA filters according to the invention may be accomplished. Like numbers depict like elements from FIGS. 1 and 2.

Shown in FIG. 3 is the intake 1 from an exhaust gas stream as might be generated, e.g., in a nuclear or waste facility. In this exemplary depiction, intake 1 leads to a filter chamber 30 in which a plurality of HEPA filters 6 are mounted. Although not depicted for each filter, an end cap 15, end cap 13 and connector 12 are shown. For each HEPA filter 6, a connector 12 connects the interior 8 of each filter to a vacuum plenum 3.

An exhaust gas stream illustrated by arrow A is filtered through filter media 14 to the interior 8 of the filters 6. The filtered gas G is drawn into the interior 4 of vacuum plenum 3 by the action of an evacuation pump 5. As the exhaust gas is filtered, particulates are collected on the influent side (14a) of each filter.

In the system according to the current invention, the filters 6 can be cleaned and regenerated on any desired schedule. Means for cleaning the filters, in a preferred embodiment, take the form of fluid nozzles 2, mounted in any known fashion, set to direct a stream of fluid at a preferably oblique angle against the influent sides of filters 6. A conduit 2a connects nozzles 2 to a source of desired fluid. Typical cleaning fluids may be any fluid suitable for the particulates being cleaned, the materials from which the filters are made, and as required by other considerations. The sprayed fluid, containing the particulates washed from the filters, can be collected in any known and desired fashion. As illustrated in FIG. 3, chamber 30 has a declivity into which fluids will gather. The fluids can be drawn off for disposal, analysis, or sampling by a valve and conduit as depicted at 25. As a safety factor, considering the high pressure drops contemplated for use in the system, a vacuum breaker 22 can be utilized to prevent excessive vacuum within vacuum plenum 3. Vacuum breaker 22 can be any conventional vacuum breaker known to the art, with its operating pressure set in accordance with the system as a whole. Connector(s) 12 for the filter(s) 6 are welded or otherwise connected in an airtight manner to the wall 21 forming exhaust plenum 3 such that the interior(s) 8 of the filter(s) 6 are in fluid communication with exhaust plenum 3. Air is thus drawn through filter(s) 6 into exhaust plenum 3 by evacuation pump 5, and cleaned air 9 is discharged from the system.

The components of the system described above should be constructed to withstand the high pressure drops (vacuums) needed to practice the cleaning and regeneration made possible by this invention. The process operating vacuum for such a system will be very similar to that using standard HEPA systems. These systems expect a pressure drop of from zero (0.0) to 1.5 kPa (0.0–6" water column) across the filter media. In the system shown in FIG. 3, then, the filter chamber must be capable of withstanding a vacuum of from 0.0 to 3.0 kPa (0–12" water column). The vacuum plenum 3, however, and the filters according to the invention, must be able to withstand the 40 kPa operating vacuum and the 105 kPa regenerating vacuum.

The exact requirements for the vacuum pump and other parts of the system can easily be determined by those of skill in the art. There will be some increased needs with the system of the claimed invention. In a standard exhaust gas stream, for example, it was found that a flow of 0.235 cubic meters per second (500 cfm) required a 0.75 kW (1.0 HP) pump. In the system of the invention, the same flow requires a pump rated at about 18.6 kW (25 HP).

The system of the invention makes possible a monitoring process heretofore impossible. That is, the particulates in an exhaust stream, for example, can be assayed on a periodic basis, or whenever desired. The process consists of filtering a stream for a desired period of time, thus collecting particulates on the HEPA filters of the invention. At a determined time, the filters are washed by directing fluid against the influent sides. The fluid and particulates are collected in a collection system, which may take any known form. A very simple form is a trough at the bottom of, e.g., the filter chamber of FIG. 3. The fluid with the particulates is drawn off and it, or an aliquot, are assayed. In the meantime, the HEPA filters are quickly regenerated by application of high vacuum, and the filtration system can be operating.

The media of the current invention has shown particulate collection efficiencies of up to 99.99%, as measured using 0.3 $\mu$ AED of DOP. The media can be made with materials other than stainless steel, and other porosities are within the metes and bounds of the invention so long as the definition of a HEPA filter is met.

The current invention provides many advantages while using simple and well known components to form a regeneratable filter system. HEPA filters of the current invention do not need to be removed for cleaning or regenerating. This eliminates the normal downtime for an exhaust stream system, reduces personnel exposure to contaminating (and perhaps radioactive) particulates, and eliminates the complicated systems needed for backwashing.

Many variations of the described invention are possible while remaining within the scope of the disclosure. Those of ordinary skill in the art will be able to optimize the various components of the system and the assembly thereof, such as the mounting of the spray nozzles. The scope of this invention is thus to be measured only by the claims, which are set forth as follows.

What is claimed is:

1. A method for periodic monitoring of a gas stream using an in situ filter system, said method comprising:
   providing an in situ filter system for said stream, said system comprising:
      a HEPA filter, said filter having an influent side and an effluent side, said influent side having an effective pore size of about 0.2 $\mu$;
      means for cleaning said filter by directing a fluid against said influent side of said filter to remove particulates therefrom; and
      means for collecting said fluid and said particulates;
   periodically activating said means for cleaning;
   collecting said fluid and said particulates from said means for collecting; and
   analyzing said particulates to monitor said gas stream.

2. A filter system for removing particulates from an air stream, said system comprising:
   a HEPA filter comprising a thin sheet formed of sintered particles, said particles having a size of approximately 1.0 $\mu$, said filter having an influent side and an effluent side;
   a cleaning system for said filter, said system comprising:
      means for spraying said influent side of said filter with a fluid; and
      means for creating a high pressure drop across said filter.

3. The filter system according to claim 2, wherein said influent side of said HEPA filter has an effective porosity of about 0.2 $\mu$.

4. The filter system according to claim 2, wherein said HEPA filter has a gas flow-through rate of about 0.00017 m$^3$ per second per 0.006 square meters (0.36 cfm per square inch) at an applied vacuum of about 40 kPa (160 inches water column).

5. The filter system according to claim 2, wherein said HEPA filter has a filtration efficiency of at least 99.97% for 0.3 $\mu$ AED using DOP aerosol.

6. The filter system according to claim 5, wherein said efficiency is 99.99%.

7. The filter system according to claim 2, wherein said HEPA filter has a thickness in the range of from about 0.033 cm (0.013 inches) to about 0.12 cm (0.047 inches).

8. The filter system according to claim 2, wherein said HEPA filter has a thickness of about 0.12 cm (0.047 inches).

9. A HEPA filter for use with a high pressure evacuation pump, said filter comprising:
   a cylinder formed of a filter media, said cylinder having an interior, an exterior, and first and second ends, said filter media comprising sintered stainless steel particles, said particles having a diameter of about 1.0 $\mu$, said media having a thickness in the range of from about 0.033 cm (0.013 inches) to about 0.12 cm (0.047 inches);
   a first gas impermeable endplate affixed to and closing said first end; and
   a second gas impermeable endplate affixed to said second end, said second endplate having an opening therein, said opening adapted to connect to said high pressure evacuation pump.

10. The HEPA filter according to claim 9, wherein said exterior has an effective porosity of about 0.2 $\mu$.

11. The HEPA filter according to claim 9, wherein said evacuation pump is capable of creating a vacuum of about 105 kPa (421 inches of water).

12. A filter system capable of in situ regeneration comprising:
   a HEPA filter formed into a cylinder, said cylinder having an exterior influent side and an interior side and first and second ends, said filter comprising sintered stainless steel particles, said particles having a diameter of about 1.0 $\mu$;
   a first impermeable endplate closing said first end;
   a second impermeable endplate closing said second end, said second endplate having an opening therein;
   a vacuum pump connected to said opening in said second endplate, said pump capable of creating a vacuum of about 105 kPa (421 inches of water); and
   at least one fluid jet nozzle capable of directing fluid against said exterior influent side of said cylinder; and
   a source of fluid operatively connected to said at least one fluid jet nozzle.

13. The filter system according to claim 12, wherein said filter has a particulate filtration efficiency of about 99.99% of 0.3 $\mu$ AED using DOP aerosol.

14. The filter system according to claim 12, wherein said filter has a flowthrough rate of about 0.00017 cubic meters per 0.006 square meters (0.36 cfm per square inch) at 40.0 kPa (160 inches of water).

* * * * *